(12) United States Patent
Minteer-Levine et al.

(10) Patent No.: US 8,774,985 B2
(45) Date of Patent: Jul. 8, 2014

(54) SYSTEMS AND METHODS FOR GENERATING A COMMAND TRAJECTORY

(75) Inventors: Jasmine Beth Minteer-Levine, Seattle, WA (US); Steven Barry Krogh, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 92 days.

(21) Appl. No.: 13/189,223

(22) Filed: Jul. 22, 2011

(65) Prior Publication Data

US 2013/0024052 A1  Jan. 24, 2013

(51) Int. Cl.
*G05D 1/08* (2006.01)
*G01C 23/00* (2006.01)

(52) U.S. Cl.
CPC ............ *G05D 1/0866* (2013.01); *G01C 23/005* (2013.01)
USPC ........ 701/4; 701/3; 701/11; 244/180; 340/961

(58) Field of Classification Search
CPC ..... G08G 5/04; G08G 5/0078; G05D 1/0808; G05D 1/0607; G05D 1/0676; G01C 23/00; G02B 27/01; G01S 19/49; G01S 11/023
USPC ..................... 701/3, 11, 117, 4; 700/63, 275; 244/220, 158.1, 199.1, 181, 180; 342/22, 26 R, 120, 357.65; 188/378; 181/207; 340/970, 961
See application file for complete search history.

(56) References Cited

U.S. PATENT DOCUMENTS

| | | | |
|---|---|---|---|
| 2,022,517 A * | 11/1935 | Patterson | 342/120 |
| 3,490,556 A * | 1/1970 | Bennett, Jr. et al. | 181/207 |
| 3,994,455 A | 11/1976 | Simpson | |
| 5,117,362 A | 5/1992 | Peckham et al. | |
| 5,377,937 A | 1/1995 | LaMay et al. | |
| 5,695,156 A * | 12/1997 | Firuz et al. | 244/180 |
| 5,781,126 A * | 7/1998 | Paterson et al. | 340/970 |
| 5,933,099 A * | 8/1999 | Mahon | 340/961 |
| 5,957,412 A * | 9/1999 | Saint Upery et al. | 244/180 |
| 5,978,715 A * | 11/1999 | Briffe et al. | 701/11 |
| 6,272,404 B1 * | 8/2001 | Amano et al. | 701/3 |
| 6,394,242 B1 * | 5/2002 | Allaei | 188/378 |
| 6,422,517 B1 * | 7/2002 | DeWitt et al. | 244/181 |
| 6,600,977 B2 | 7/2003 | Johnson et al. | |

(Continued)

FOREIGN PATENT DOCUMENTS

WO   WO 8809027 A1 * 11/1988   ............... G08G 5/04

OTHER PUBLICATIONS

Extended European Search Report for Application No. 12162021; Sep. 16, 2013; 6 pages.

*Primary Examiner* — Tuan C. To
*Assistant Examiner* — Yuri Kan
(74) *Attorney, Agent, or Firm* — Armstrong Teasdale LLP

(57) ABSTRACT

A system for use in generating a command trajectory for an aircraft is provided. The system includes a natural frequency determining module configured to determine a closure rate of the aircraft to a selected flight path, compare the closure rate of the aircraft to a threshold closure rate, and calculate a natural frequency based on whether the closure rate is below the threshold closure rate. The system further includes a command processor coupled to the natural frequency determining module and configured to receive the calculated natural frequency from the natural frequency determining module, and generate a command trajectory using the calculated natural frequency.

18 Claims, 4 Drawing Sheets

(56) References Cited

U.S. PATENT DOCUMENTS

| | | |
|---|---|---|
| 2002/0066829 A1* | 6/2002 | DeWitt et al. .................. 244/181 |
| 2003/0150961 A1* | 8/2003 | Boelitz et al. .................. 244/172 |
| 2005/0065671 A1* | 3/2005 | Horvath et al. .................... 701/3 |
| 2005/0080495 A1* | 4/2005 | Tessier et al. .................... 700/63 |
| 2006/0229801 A1* | 10/2006 | Fink et al. ..................... 701/117 |
| 2007/0164167 A1* | 7/2007 | Bachelder et al. ............. 244/220 |
| 2008/0294307 A1 | 11/2008 | Krogh |
| 2010/0117892 A1* | 5/2010 | Barbaresco .................. 342/26 R |
| 2010/0294890 A1* | 11/2010 | Journade .................... 244/199.1 |
| 2011/0037639 A1* | 2/2011 | Duran Toro et al. ............. 342/22 |
| 2011/0118911 A1 | 5/2011 | Ishihara |
| 2011/0122023 A1* | 5/2011 | Goudon et al. .......... 342/357.65 |
| 2012/0053735 A1* | 3/2012 | Tessier et al. ................. 700/275 |

\* cited by examiner

US 8,774,985 B2

SYSTEMS AND METHODS FOR GENERATING A COMMAND TRAJECTORY

BACKGROUND

The field of the disclosure relates generally to flight control systems for aircraft, and, more particularly, to systems and methods for use in generating command trajectories for aircraft.

Automatic flight control systems for aircraft allow aircraft to automatically capture and hold a selected altitude, glideslope, and/or other types of vertical path or trajectory. This is typically accomplished via an autopilot that computes a command trajectory. Based on the computed command trajectory, automatic flight control systems cause various aircraft control surfaces to selectively perform such that the aircraft maneuvers to capture the desired trajectory.

BRIEF DESCRIPTION

In one aspect, a system for use in generating a command trajectory for an aircraft is provided. The system includes a natural frequency determining module configured to determine a closure rate of the aircraft to a selected flight path, compare the closure rate of the aircraft to a threshold closure rate, and calculate a natural frequency based on whether the closure rate is below the threshold closure rate. The system further includes a command processor coupled to the natural frequency determining module and configured to receive the calculated natural frequency from the natural frequency determining module, and generate a command trajectory using the calculated natural frequency.

In another aspect, a processing device for use in generating a command trajectory for an aircraft is provided. The processing device is configured to determine a closure rate of the aircraft to a selected flight path, compare the closure rate of the aircraft to a threshold closure rate, calculate a natural frequency based on whether the closure rate is below the threshold closure rate, and supply the calculated natural frequency to a command processor configured to generate a command trajectory based on the calculated natural frequency.

In yet another aspect, a method for performing a change in the flight path of an aircraft is provided. The method includes comparing an initial flight path of the aircraft to a selected flight path that is to be captured by the aircraft to determine whether the initial flight path is nearly parallel to the selected flight path, and expediting a capture maneuver of the selected flight path when the initial flight path is nearly parallel to the selected flight path.

DETAILED DESCRIPTION

The systems and methods described herein provide improvements over at least some known flight control systems. More specifically, the systems and methods described herein enable a closure rate of an aircraft with a selected flight path to be determined. A natural frequency is calculated based on the closure rate, and the calculated natural frequency is used to generate a command trajectory. When an aircraft is flying nearly parallel to a selected flight path, an augmented command trajectory is generated, and the aircraft performs an expedited capture maneuver to capture the selected flight path.

At least some flight control systems and methods as are known in the art and referenced herein are described in U.S. Pat. No. 5,695,156, the contents of which are hereby incorporated by reference in its entirety.

Figure 1:
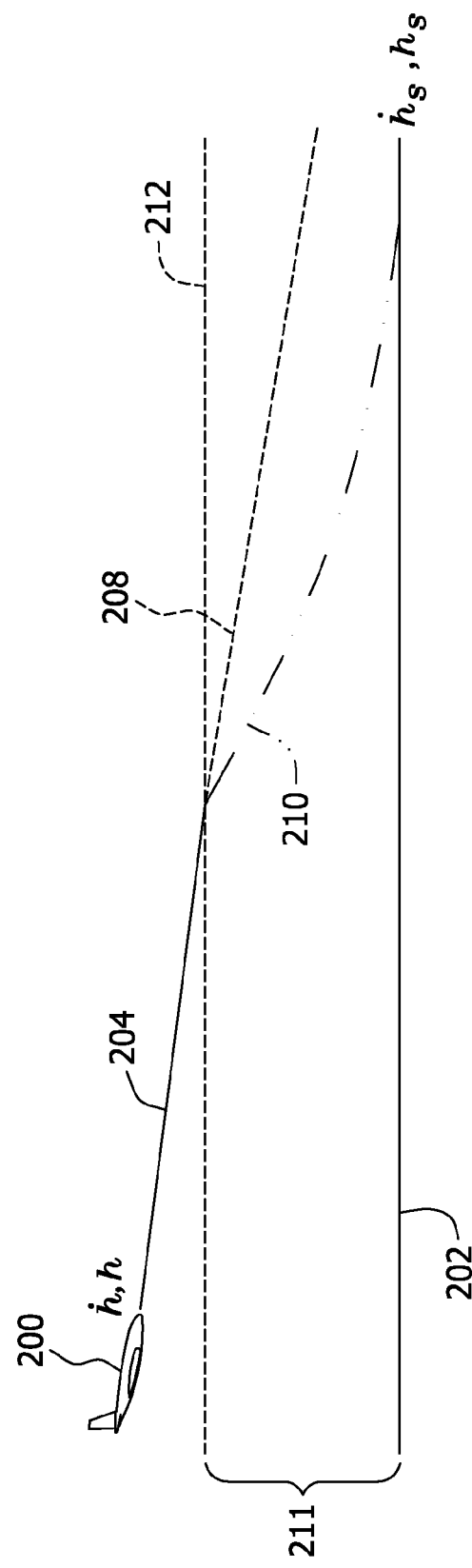
FIG. 1 is a schematic diagram of an aircraft capturing a selected flight path.

FIG. 1 is a schematic diagram of an aircraft 200 capturing a selected flight path 202. Aircraft 200 initially has current altitude h and current vertical speed $\dot{h}$ that define an initial flight path 204. Selected flight path 202 is defined by selected altitude $h_s$ and selected vertical speed $\dot{h}_s$. Notably, in FIG. 1, initial flight path 204 is nearly parallel to selected flight path 202. More specifically, the value of current vertical speed $\dot{h}$ is relatively close to the value of selected vertical speed $\dot{h}_s$.

When initial flight path 204 is nearly parallel to selected flight path 202, a capture maneuver may be initiated even though the aircraft may not be in at least some of the capture regions as known in the art. An alternative calculation of the natural frequency may be used in this case, as using the natural frequency calculations as known in the art may result in a non-optimal capture maneuver. For example, if a natural frequency calculation is performed as known in the art, as current vertical speed $\dot{h}$ is relatively close to selected vertical speed $\dot{h}_s$, the natural frequency $\omega_n$ may be relatively small. As shown in FIG. 1, a command trajectory 208 generated using a relatively small $\omega_n$ results in aircraft 200 executing a relatively slow capture of selected flight path 202.

In the exemplary embodiment, selected flight path 202 is a glideslope flight path. Alternatively, selected flight path 202 may be a constant altitude flight path or any other desired flight path. When initial flight path 204 is nearly parallel to selected flight path 202, an augmented natural frequency $\omega'_n$ is calculated and used to generate an augmented command trajectory 210, as described in detail below. Moreover, in embodiments where selected flight path 202 is a glideslope flight path, the augmented natural frequency $\omega'_n$ may be calculated such that aircraft 200 captures selected flight path 202 above a decision height and/or before performing a flare maneuver.

In the exemplary embodiment, the augmented natural frequency $\omega'_n$ is greater than the natural frequency $\omega_n$ calculated as known in the art. As shown in FIG. 1, augmented command trajectory 210 results in aircraft 200 capturing selected flight path 202 in a shorter distance and time than command trajectory 208. That is, because the augmented natural frequency $\omega'_n$ is greater than the natural frequency $\omega_n$, augmented command trajectory 210 results in an expedited capture maneuver as compared to command trajectory 208.

FIG. 1 also shows a region 211 that includes a threshold 212. Unlike at least some of the capture regions known in the art, in at least some embodiments, the boundaries of region 211 may not be dependent upon current altitude h, current vertical speed $\dot{h}$, selected altitude $h_s$, and selected vertical speed $\dot{h}_s$. Instead, region 211 may be defined as a predetermined range from selected flight path 202 to a threshold 212 located a fixed distance from selected flight path 202. In the exemplary embodiment, threshold 212 is parallel to selected flight path 202 and set a fixed distance from selected flight path 202. Threshold 212 may be set any predetermined fixed distance from selected flight path 202 that enables generation of augmented command trajectory 210 as described herein.

Figure 2:
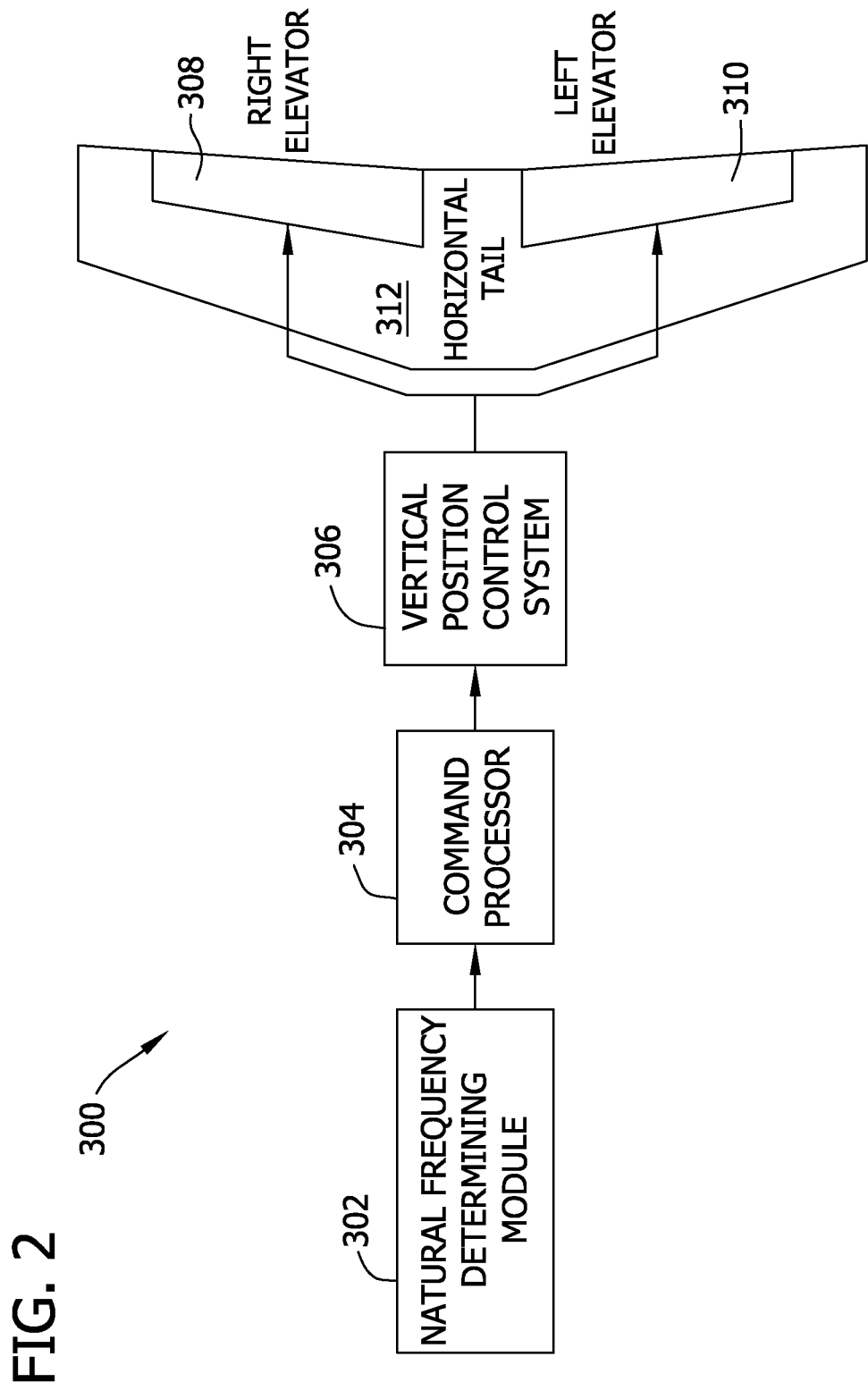
FIG. 2 is a block diagram of an exemplary system for generating a command trajectory and controlling an aircraft to follow that trajectory.

FIG. 2 is a block diagram of an exemplary system 300 for generating an augmented command trajectory and controlling an aircraft to follow the generated trajectory, such as augmented command trajectory 210 (shown in FIG. 1). System 300 includes a natural frequency determining module 302, a command processor 304, and a vertical position control system 306.

In the exemplary embodiment, natural frequency determining module 302 determines whether initial flight path 204 of aircraft 200 is nearly parallel to selected flight path 202 by determining a closure rate of aircraft 200. The closure rate is defined as $|\dot{h}-\dot{h}_s|$, and represents the speed at which aircraft 200 is approaching selected flight path 202. Accordingly, a relatively low closure rate indicates that initial flight path 204 is nearly parallel to selected flight path 202, while a relatively high closure rate indicates that initial flight path 204 is not nearly parallel to selected flight path 202.

Once the closure rate is determined, natural frequency determining module 302 compares the closure rate with a threshold closure rate. In the exemplary embodiment, the threshold closure rate is a constant ft/sec threshold calculated based on a maximum allowable time between initiating a capture maneuver and acquiring selected flight path 202. Further, in at least some embodiments, threshold closure rate is a predetermined value. Alternatively, the threshold closure rate may be any value and/or calculated using any methods that enable system 300 to function as described herein.

If the determined closure rate is above or equal to the threshold closure rate, natural frequency determining module 302 calculates the natural frequency $\omega_n$ as is known in the art.

If the determined closure rate is below the threshold closure rate, natural frequency determining module 302 calculates the augmented natural frequency $\omega'_n$. The augmented natural frequency $\omega'_n$ may be calculated using various methods. In some embodiments, the augmented natural frequency $\omega'_n$ is calculated as a predetermined multiple of the natural frequency $\omega_n$ that is calculated as is known in the art. In other embodiments, the augmented natural frequency $\omega'_n$ may be calculated as if aircraft 200 were located in one of the capture regions known in the art, even when aircraft 200 is not actually located within the particular capture region.

Further, in other embodiments, the augmented natural frequency $\omega'_n$ is set to a predetermined fixed value. Alternatively, the augmented natural frequency $\omega'_n$ may be calculated using any methods that enable system 300 to function as described herein. As described above, in the exemplary embodiment, the augmented natural frequency $\omega'_n$ is greater than the natural frequency $\omega_n$ calculated as is known in the art.

Accordingly, in the exemplary embodiment, if the determined closure rate is below the closure rate threshold, natural frequency determining module 302 calculates the augmented natural frequency $\omega'_n$. In an alternate embodiment, natural frequency determining module 302 calculates the augmented natural frequency $\omega'_n$ (as opposed to natural frequency $\omega_n$) when the closure rate is below the closure rate threshold and aircraft 200 is located in region 211. That is, in some embodiments, the augmented natural frequency $\omega'_n$ is only calculated when the aircraft 200 is located between selected flight path 202 and threshold 212 (both shown in FIG. 1).

Natural frequency determining module 302 is coupled to command processor 304. In the exemplary embodiment, command processor 304 is a command processor as is known in the art. Natural frequency determining module 302 supplies the calculated natural frequency ($\omega'_n$ or $\omega_n$) to command processor 304, and command processor 304 generates a command trajectory in terms of commanded altitude $h_c$ and commanded vertical speed $\dot{h}_c$, using the systems and methods as known in the art. When the calculated natural frequency is the augmented natural frequency $\omega'_n$, to generate augmented command trajectory 210, the augmented natural frequency $\omega'_n$ is simply substituted for $\omega_n$ where appropriate in the systems, methods and/or equations known in the art.

Command processor 304 is coupled to vertical position control system 306. In the exemplary embodiment, vertical position control system 306 is a vertical position control system as is known in the art. Using the methods and systems known in the art, vertical position control system 306 generates an elevator command $\delta_e$. In the exemplary embodiment, vertical position control system 306 controls operation of a right elevator 308 and a left elevator 310 on a horizontal tail 312 of aircraft 200. Specifically, vertical position control system 306 controls right elevator 308 and left elevator 310 based on elevator command $\delta_e$ such that aircraft 200 follows the command trajectory generated by command processor 304.

While in the exemplary embodiment, natural frequency determining module 302, command processor 304, and vertical position control system 306 are shown as three separate components, one or more of natural frequency determining module 302, command processor 304, and vertical position control system 306 may be implemented using the same processing device.

Figure 3:
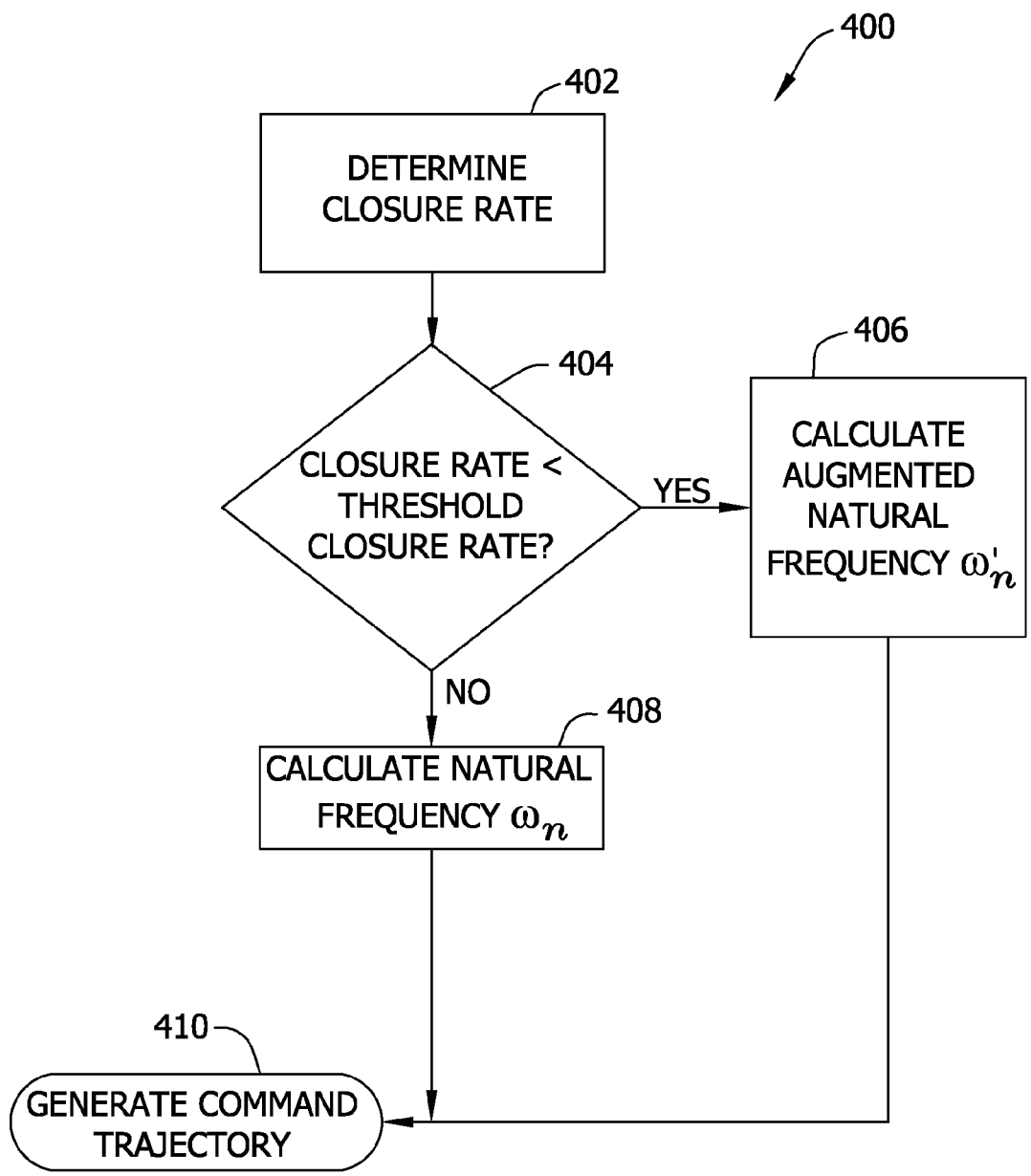
FIG. 3 is a flow diagram of an exemplary method for generating a command trajectory.

FIG. 3 is a flow diagram of an exemplary method 400 for generating a command trajectory. The method 400 includes determining 402 the closure rate for an aircraft, such as aircraft 200. The closure rate is compared to a threshold closure rate to determine 404 whether the closure rate is below the threshold closure rate. If the closure rate is below the threshold closure rate, an augmented natural frequency $\omega'_n$ is calculated 406. If the closure rate is above or equal to the threshold closure rate, a natural frequency $\omega_n$ is calculated 408. The calculated natural frequency ($\omega'_n$ or $\omega_n$) is then used to generate 410 a corresponding command trajectory. When the calculated natural frequency is the augmented natural frequency $\omega'_n$, the command trajectory is referred to as an augmented command trajectory.

Figure 4:
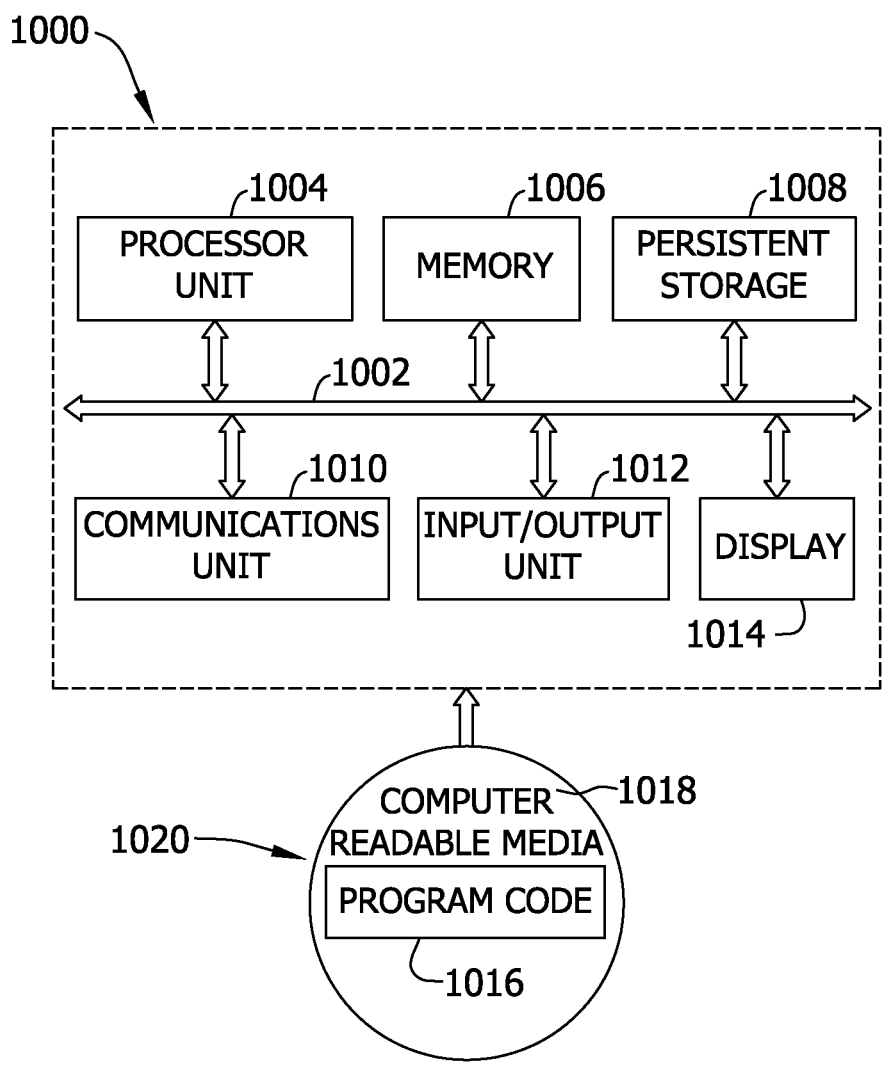
FIG. 4 is a diagram of an exemplary data processing system that may be used in implementing one or more of the embodiments described herein.

FIG. 4 is a diagram of an exemplary data processing system 1000 that may be used in implementing one or more of the embodiments described herein. For example, natural frequency determining module 302, command processor 304, and/or vertical position control system 306 may be implemented using data processing system 1000. In the exemplary embodiment, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a set of one or more processors or may be a multi-processor core, depending on the particular implementation. Further, processor unit 1004 may be implemented using one or more heterogeneous processor systems in which a main processor is present with secondary processors on a single chip.

As another illustrative example, processor unit 1004 may be a symmetric multi-processor system containing multiple processors of the same type. Further, processor unit 1004 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

Memory 1006 and persistent storage 1008 are examples of storage devices. A storage device is any piece of hardware that is capable of storing information either on a temporary basis and/or a permanent basis. Memory 1006, in these examples, may be, for example, without limitation, a random access memory or any other suitable volatile or non-volatile storage device. Persistent storage 1008 may take various forms depending on the particular implementation.

For example, without limitation, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, without limitation, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communication links.

Input/output unit 1012 allows for input and output of data with other devices that may be connected to data processing system 1000. For example, without limitation, input/output unit 1012 may provide a connection for user input through a keyboard and mouse. Further, input/output unit 1012 may send output to a printer. Display 1014 provides a mechanism to display information to a user.

Instructions for the operating system and applications or programs are located on persistent storage 1008. These instructions may be loaded into memory 1006 for execution by processor unit 1004. The processes of the different embodiments may be performed by processor unit 1004 using computer implemented instructions, which may be located in a memory, such as memory 1006. These instructions are referred to as program code, computer usable program code, or computer readable program code that may be read and executed by a processor in processor unit 1004. The program code in the different embodiments may be embodied on different physical or tangible computer readable media, such as memory 1006 or persistent storage 1008.

Program code 1016 is located in a functional form on computer readable media 1018 that is selectively removable and may be loaded onto or transferred to data processing system 1000 for execution by processor unit 1004. Program code 1016 and computer readable media 1018 form computer program product 1020 in these examples. In one example, computer readable media 1018 may be in a tangible form, such as, for example, an optical or magnetic disc that is inserted or placed into a drive or other device that is part of persistent storage 1008 for transfer onto a storage device, such as a hard drive that is part of persistent storage 1008. In a tangible form, computer readable media 1018 also may take the form of a persistent storage, such as a hard drive, a thumb drive, or a flash memory that is connected to data processing system 1000. The tangible form of computer readable media 1018 is also referred to as computer recordable storage media. In some instances, computer readable media 1018 may not be removable.

Alternatively, program code 1016 may be transferred to data processing system 1000 from computer readable media 1018 through a communications link to communications unit 1010 and/or through a connection to input/output unit 1012. The communications link and/or the connection may be physical or wireless in the illustrative examples. The computer readable media also may take the form of non-tangible media, such as communications links or wireless transmissions containing the program code.

In some illustrative embodiments, program code 1016 may be downloaded over a network to persistent storage 1008 from another device or data processing system for use within data processing system 1000. For instance, program code stored in a computer readable storage medium in a server data processing system may be downloaded over a network from the server to data processing system 1000. The data processing system providing program code 1016 may be a server computer, a client computer, or some other device capable of storing and transmitting program code 1016.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 4 can be varied from the illustrative examples shown.

As one example, a storage device in data processing system 1000 is any hardware apparatus that may store data. Memory 1006, persistent storage 1008 and computer readable media 1018 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 1006 or a cache such as that found in an interface and memory controller hub that may be present in communications fabric 1002.

The systems and methods described herein provide improvements over at least some known flight control systems, as the systems and methods described herein enable an aircraft to perform an expedited capture maneuver when the aircraft is in a flight path that is nearly parallel to a selected flight path. More specifically, the systems and methods described herein determine a closure rate of an aircraft with a selected flight path. A natural frequency is calculated based on the closure rate, and the calculated natural frequency is used to generate a command trajectory. When an aircraft is flying nearly parallel to a selected flight path, an augmented command trajectory is generated, and the aircraft performs the expedited capture maneuver to capture the selected flight path.

The systems described herein may be implemented or performed using one or more computers or computing devices. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for use in capture of a selected flight path for an aircraft, said system comprising:
    a frequency determining module configured to:
        calculate a natural frequency based on a closure rate of the aircraft to the selected flight path; and
        calculate an augmented frequency that is greater than the natural frequency when the closure rate of the aircraft to the selected flight path is below a threshold closure rate; and
    a command processor coupled to said frequency determining module and configured to:
        receive the natural frequency;
        generate a command trajectory to capture the selected flight path in a capture maneuver;
        receive the augmented frequency; and
        generate an augmented command trajectory to capture the selected flight path in an expedited capture maneuver as compared to the capture maneuver of the command trajectory.

2. A system in accordance with claim 1, wherein to calculate the augmented frequency, said frequency determining module is further configured to set the augmented frequency to a predetermined fixed value when the closure rate is below the threshold closure rate.

3. A system in accordance with claim 1, wherein to calculate the augmented frequency, said frequency determining module is further configured to
    calculate the augmented frequency as a predetermined multiple of the natural frequency.

4. A system in accordance with claim 1, said system further comprising a vertical position control system coupled to said command processor and configured to control the aircraft, using one of the command trajectory and the augmented command trajectory, such that the aircraft captures the selected flight path.

5. A system in accordance with claim 1, wherein the selected flight path is a glideslope flight path.

6. A system in accordance with claim 5, said system further comprising a vertical position control system coupled to said command processor and configured to control the aircraft, using one of the command trajectory and the augmented command trajectory, such that the aircraft captures the glideslope flight path above a decision height.

7. A processing device for use in capture of a selected flight path for an aircraft, said processing device configured to:
    calculate a natural frequency based on a closure rate of the aircraft to the selected flight path;
    calculate an augmented frequency that is greater than the natural frequency when the closure rate of the aircraft to the selected flight path is below a threshold closure rate;
    supply the natural frequency to a command processor; and
    supply the augmented frequency to the command processor, wherein the command processor is configured to generate a command trajectory for capturing the selected flight path.

8. A processing device in accordance with claim 7, wherein the selected flight path is a glideslope flight path.

9. A processing device in accordance with claim 7, wherein to calculate the augmented frequency, said processing device is further configured to set the augmented frequency to a predetermined fixed value when the closure rate is below the threshold closure rate.

10. A processing device in accordance with claim 7, wherein to calculate a natural the augmented frequency, said processing device is further configured to
    calculate the augmented frequency as a predetermined multiple of the natural frequency.

11. A processing device in accordance with claim 7, wherein to calculate the augmented frequency, said processing device is further configured to
    calculate the augmented frequency only when the closure rate is below the threshold closure rate and the aircraft is within a predetermined vertical range from the selected flight path.

12. A method for performing a change in the flight path of an aircraft, said method comprising:
    calculating a natural frequency;
    calculating an augmented frequency that is greater than the natural frequency;
    comparing an initial flight path of the aircraft to a selected flight path that is to be captured by the aircraft to determine whether the initial flight path is nearly parallel to the selected flight path; and
    capturing the selected flight path using a command trajectory generated using the natural frequency unless the initial flight path is nearly parallel to the selected flight path,
    wherein the selected flight path is captured using an augmented command trajectory generated using the augmented frequency when the initial flight path is nearly parallel to the selected flight path.

13. A method in accordance with claim 12, wherein comparing an initial flight path to a selected flight path comprises:
    determining a closure rate of the aircraft to the selected flight path; and
    comparing the closure rate of the aircraft to a threshold closure rate.

14. A method in accordance with claim 13, wherein calculating the augmented frequency comprises setting the augmented frequency to a predetermined fixed value.

15. A method in accordance with claim 13, wherein
    using the command trajectory results in a slower capture of the selected flight path than using the augmented command trajectory.

16. A method in accordance with claim 13, wherein calculating the augmented frequency comprises
    calculating an augmented frequency that is a predetermined multiple of the natural frequency.

17. A method in accordance with claim 12, wherein comparing an initial flight path of the aircraft to a selected flight path comprises comparing the initial flight path to a glideslope flight path.

18. A method in accordance with claim 17, wherein capturing the selected flight path using an augmented command trajectory comprises capturing the glideslope flight path above a decision height.

* * * * *